United States Patent Office 3,404,108
Patented Oct. 1, 1968

3,404,108
PAVEMENT COATING COMPOSITION
COMPRISING PETROLEUM RESIN
Joseph Regenstein, Jr., Chicago, and John C. Tapas, Glenview, Ill., assignors to Velsicol Chemical Corporation, a corporation of Delaware
No Drawing. Filed Dec. 18, 1964, Ser. No. 419,558
The portion of the term of the patent subsequent to Jan. 10, 1984, has been disclaimed
9 Claims. (Cl. 260—4)

This invention relates to sealing and coloring pavements. More particularly this invention relates to a coating composition and a method for its use in sealing and coloring pavements.

It is commonly known that pavements, particularly asphalt pavements, are porous and permit moisture to seep through the pavements and erode the various subcourses under the pavement. Moisture may also seep through the pavement due to cracks in the pavement and to the oxidation of the asphalt which binds the aggregate in asphalt pavements, the latter due, at least in part, to exposure of the surface to the heat and rays of the sun.

Fracturing of pavement often occurs due to the moisture in the pavement during freeze-thaw cycles in cold weather. The result of these effects is a weakened pavement having a greatly shortened useful life. In the past, repaving of the highway, street, or path was the only method of controlling the deterioration of the pavement without relying on season and often continuous maintenance.

Recently thin coatings of asphalt and asphaltic materials, either alone or in combination with aggregates, have been developed which seal the pores and cracks in the pavement thus preventing the seepage of water. However, these coatings utilizing asphalt, and asphaltic materials, such as tar and like bituminous mixtures are themselves often porous, and the resulting coated pavement deteriorates in the same manner as the original pavement over a slightly longer period. Also, when these coatings are applied to existing pavements which are of better construction and are more expensive, such as concrete, the coating often deteriorates at a faster rate than the existing pavement, requiring more extensive maintenance than would have been required without the coating and detracting from the advantages of the better constructed pavement.

In addition, the previously known coatings from asphalt and the like contain bitumens, which from its inherent nature are dark in color, preventing white, light colored, and colored surfaces on the pavements. Thus on dark pavements, such as asphalt pavements, the pavement retained its dark coloring upon coating; whereas on light colored pavements, such as expensive concrete pavements, the coatings resulted in dark surfaces which destroyed the benefit of the light-reflecting, durable, light colored surface.

Therefore, it is one object of the present invention to provide a coating composition for sealing pavements which does not deteriorate rapidly and results in a colored surface.

It is another object of the present invention to provide a coating composition which is easily applied and results in a ductile non-porous, durable, sealed surface, and which has improved properties over asphalt coatings.

Still another object of the present invention is to provide a method for sealing and coloring pavement which is economical, rapid, and provides a durable, non-porous, ductile, sealed surface.

These and other objects of the present invention will be apparent from the following description:

The composition of the present invention comprises pigment, water, and an aqueous emulsion of a mixture of hydrocarbon resin and oil, as hereinafter described.

More particularly, there are a number of various pigments and combinations of pigments which can be used in the composition of the present invention. Among the suitable pigments are: titanium oxide; lead chromate; lead chromate mixed with various amounts of lead sulfate; lampblack; copper phthalocyanine; copper phthalocyanine with hydrogen atoms replaced with chlorine atoms; "molybdate orange" composed of lead chromate, lead sulfate and lead molybdate; iron oxide; toluidine red; natural and synthetic iron oxide reds; chrome oxide; and the like. While almost any available water can be used in the present composition, it is preferred to utilize clear, potable water.

The essential ingredients of the aqueous emulsion utilized in the composition of the present invention are water and a mixture of substantially non-polymerizable, thermoplastic, light colored hydrocarbon resin produced by polymerization of unsaturated petroleum fractions; and oil selected from the group consisting of aromatic oil, naphthenic oil consisting essentially of a mixture of alicyclic hydrocarbons, and mixtures thereof, said oils being relatively viscous. An emulsifier for the resin and oil mixture is preferably utilized to form a stable resin and oil mixture-in-water emulsion.

In the resin and oil mixture described above, it is preferred to employ a substantially completely polymerized aromatic, thermoplastic, hydrocarbon resin produced by polymerization of unsaturated petroleum fractions, e.g. by polymerization of "dripolene," a commonly known mixture of unsaturated hydrocarbons obtained in the high temperature pyrolysis of normally gaseous hydrocarbons, the resin having a softening point range of from about 220° to about 300° F., a mixed aniline point of from about 20° to about 60° C., an iodine number of from about 40 to about 160, an acid number of from 0 to about 4, and a molecular weight of from about 600 to about 1700 as determined by cryoscopic means. Hydrocarbon resins of this description and having the properties defined herein can be readily prepared as described in U.S. Patent No. 2,798,866. This patent also defines the term "dripolene."

It is also preferred to use as the oil in the resin and oil mixture described above, oil selected from the group consisting of aromatic oil consisting essentially of a mixture of highly viscous aromatic compounds, having a viscosity of from about 120 to about 300 S.S.U. at 210° F., and an aniline point of from about 20 to about 60° C.; naphthenic oil consisting essentially of a mixture of viscous alicylic hydrocarbons, having a viscosity of from about 40 to about 200 S.S.U. at 210° F., and an aniline point of from about 50 to about 150° C.; and mixtures thereof; said oils preferably being light in color and relatively viscous. Aromatic and naphthenic oils of this description are commercially available. For example, a suitable aromatic oil is one having a viscosity of about 230–270 S.S.U. at 210° F. and an aniline point of 40–50° C. which is marketed as Penola WS–3267. A naphthenic oil suitable as an ingredient as described herein is one having a viscosity of 80–90 S.S.U. at 210° F., and an aniline point of about 75° C., which is marketed as Circosol 596.

The mixture described above is utilized in the form of an aqueous emulsion. A typical resin-in-water emulsion composition useful as described herein can be readily prepared by heating the resin and oil mixture, until the mixture is almost molten, adding emulsifiers and, if desired, wetting agents, and mixing with water until an emulsion is formed.

The emulsifiers and wetting agents useful to form the aqueous emulsions are surface active materials of the cationic, anionic and nonionic types. Use of anionic and nonionic emulsifiers and anionic-nonionic emulsifier pairs are preferred to obtain rapid emulsions of excellent stability. Typical examples of such surface-active materials are sodium stearate, morpholine oleate, sodium lauryl sulfate, sodium 2-ethylhexyl sulfate, sodium 2-ethylhexanol-1 sulfate, sodium 7-ethyl-2-methyl-undecanol-4 sulfate, sodium naphthalene sulfonate, sodium alkylnaphthalenesulfonate, sodium oleic acid sulfonate, sodium castor oil sulfonate, glycerol monostearate containing a soap (or a sodium fatty alcohol sulfate), polyoxyethylene fatty alcohol ethers, polyglycol fatty acid esters, polyoxyethylene modified fatty acid esters, polyoxyethylene-polyol fatty acid esters, polyoxypropylene fatty alcohol ethers, polyoxypropylene glycol fatty acid esters, polyoxypropylene modified fatty acid esters, polyoxypropylene-polyol fatty acid esters, polyol fatty acid monoesters, di- and higher polyhydric alcohol fatty acid esters, cholesterol and other fatty acid esters, lanolin, oxidized fatty oils, alkylated aryl polyether alcohols such as the condensation product of diamylphenol with ethylene oxide, and the like.

In preparing the composition of the present invention a proportion of suitable pigment is used with a minor proportion of water and a major proportion of emulsion. Preferably, the composition comprises about 10% to about 40% light stable pigment, about 15% to about 40% water, and about 30% to about 80% emulsion. In addition, the composition can also contain from 0%, preferably from about 2, to about 50% of the weight of total ingredients of an extender for the pigment and from 0%, preferably from about 2, to about 25% of the total ingredients of an additive selected from the group consisting of wetting agents, dispensing agents, defoaming agents, antifreeze agents, preservatives, protective colloids, and mixtures thereof.

It is preferred that an emulsion comprising a mixture of from about 30 to about 70 parts by weight of the described resin and from about 30 to about 70 parts by weight of the heretofore described oil, with an emulsifying quantity of emulsifier and from about 15 to about 75 percent by weight water based on the weight of the resin and viscous oil mixture and emulsifier, be used as the emulsion ingredient.

In a preferred embodiment of the invention, the composition is comprised of from about 10 to about 40 parts by weight pigment; from about 15 to about 40 parts by weight water; and from about 30 to about 80 parts by weight of an emulsion comprising from about 45 to about 70 parts by weight of a mixture comprising from about 30 to about 70 percent by weight of the preferred resin and from about 30 to about 70 percent by weight of the described oil, from about 2 to about 10 parts by weight of the emulsifier for the resin and oil mixture, and from about 20 to about 50 parts by weight water.

The composition of the present invention can be readily improved by incorporating rubbers into the resin and oil mixture in the emulsion. The natural or synthetic hydrocarbon rubbers, such as butadiene-styrene copolymer, polyisoprene, polybutadiene, polyisobutylene, and their mixtures, and the like, are suitable for this purpose. The addition of rubber has been found to improve certain properties of the resulting coating, such as ductility, especially cold weather ductility, wear and stability. The rubber additives are most easily usable in the form of crumbs, pellets, beads, etc. to facilitate dissolution into the resin and oil solution or in the form of an emulsion or rubber latex added to the emulsion of the resin and oil mixture. To effect this improvement in the composition, it has been found satisfactory to add from about 1 to about 10 parts by weight of the hydrocarbon rubber to the resin and oil mixture or in the rubber emulsion or latex, heretofore described, and thus the rubber normally is present in an amount of from about 1 to about 10 percent based on the weight of the said oil and resin mixture.

The composition of the present invention can be readily improved by incorporating therein extenders for the pigment and/or various additives. It has been found that the composition has the most desirable properties when the least amount of pigment is utilized. However, to effectively color the pavement, large quantities of pigment are often required. The use of various pigment extenders, in an amount from 0% to 50% by weight of the total ingredients, permits the use of substantially less pigment to obtain the same coloring and the retention of, and in some cases marked improvement in, the desirable properties of the composition. It is preferred to utilize from 0 to about 50 parts by weight of an extender for the pigment selected from the group consisting of calcium carbonate, talc, mica, pumice, diatomaceous silicas, synthetic calcium silicates, hydrated sodium silico aluminate, coprecipitate of titanium dioxide and barium sulfate, coprecipitate of titanium dioxide and calcium sulfate, mixtures of silicon dioxide and calcium oxide, and the like, and mixtures thereof.

As heretofore stated, it is desirable for the composition to contain up to 25% of one or more wetting agents, dispersing agents, defoaming agents, antifreeze agents, preservatives, protective colloids, and mixtures thereof. In a preferred embodiment of this invention, the compositions contain from 0 to about 25 parts by weight of an additive selected from the group consisting of tetrapotassium pyrophosphate, ethylene glycol, ditertiary acetylenic glycol, phenyl mercuric acetate, sodium salt of pentachlorophenol, hydroxy ethyl cellulose, methyl cellulose, carboxy methyl cellulose, polyvinyl alcohol emulsions, polyvinyl acetate emulsions, polyoxyethylated octylphenol, vinyl acrylate emulsions, and mixtures thereof.

The composition of the present invention can be prepared readily, by first preparing the resin and oil mixture, then preparing the emulsion of the mixture and then preparing the desired composition therewith. The resin and oil mixture can be prepared by blending a heated mixture of the synthetic thermoplastic hydrocarbon resin and an oil selected from the group consisting of aromatic oil, naphthenic oil, and mixtures thereof.

Thus, for example, the resin comprising about 30 to about 70 parts by weight of the mixture is added to the previously specified oil comprising from about 30 to about 70 parts by weight of the mixture, and heated with stirring until the resin is dissolved. Alternatively, the resin can be heated until molten and added to the oil in that condition. The preparation can also be readily carried out in a convenient quantity of aromatic solvent at lower blending temperatures. The amount of solvent is not critical, and an example of a convenient quantity of solvent is an amount of aromatic solvent equal in weight to the weight of the resin and oil mixture. Exemplary of the suitable solvents are benzene, toluene, xylene, and mixtures of these or any other aromatic solvents.

If the mixture is prepared without a solvent, the oil is heated to a temperature of between about 200° and 320° F., and the rubber, if used, and resin blended therein preferably under a blanket of inert gas such as carbon dioxide or nitrogen.

If a solvent is used, the oil can be added to the solvent before or at the same time the synthetic hydrocarbon resin is added. The addition is conveniently performed at atmospheric pressure and at a temperature of between about 100° and 260° F. with vigorous stirring until the resin has dissolved into the solution. To improve the composition, it is preferred to add from about 1 to about 10 parts by weight of a hydrocarbon rubber as aforesaid to the solvent before the resin and oil are added. The rubber is added to the solvent at a solvent temperature of between about 100° and 260° F. and stirred for several hours until the viscosity of the rubber-solvent solution remains constant.

After the resin and oil have been added and dissolved into solution, the solvent or solvent mixture is removed by stripping in vacuo or by any other solvent removing process. The stripping is readily performed at atmospheric pressure at the boiling point of the solvent or solvent mixture or at lower temperatures if reduced pressure is used.

As heretofore described, the resin and oil, and rubber if used, mixture is utilized in the form of an aqueous emulsion. This emulsion can be readily prepared by heating the mixture until it is almost molten, adding the emulsifier, and, if desired, wetting agents thereto, and mixing with water until an emulsion is formed. At first a water-in-resin and oil mixture emulsion is formed, which can be slowly mixed through an inversion period to yield a concentrated resin and oil mixture-in-water emulsion. This emulsion can be further diluted with water to any desired concentration. The temperature at which the emulsion is prepared is dependent upon the softening point of the resin and oil mixture and will vary from about 125° to about 200° F., with the lower temperatures being used with lower softening point mixtures and the higher temperatures with higher softening point mixtures.

Where rubber is to be added to the emulsion described above in the form of an emulsion or a latex to improve the composition, suitable rubber emulsions and latexes for this purpose are readily available commercially. Exemplary of these suitable materials are centrifuged natural rubber emulsion, natural rubber latex, styrene-butadiene emulsion, butyl rubber emulsion, and the like.

The coating composition of the present invention can be prepared readily by charging at least a substantial portion of the water to be added to a suitable mixing device, such as an agitated tank, and adding the additives, if used, such as wetting agents, dispersing agents, preservatives, defoaming agents, etc. thereto. Pigment or pigment mixtures are next added to the tank followed by pigment extenders, if used. Additional water can be added to maintain the dispersion at a workable consistency. After the dispersion is thoroughly mixed, protective colloids and defoaming agents, if used, are added. The previously prepared resin-oil emulsion is then slowly added with stirring. The viscosity of the final composition may then be adjusted by addition of water or an aqueous solution of hydroxy ethyl cellulose.

The method of the present invention comprises applying the aforesaid composition to pavement. The composition of the present invention can be applied to pavements in various manners readily recognizable to the art. For example, the simplest manner of applying the composition is to pour portions of the composition on the pavement and then spread it evenly by the use of brooms or squeegees. A more efficient manner of application is to spray the composition under pressure using any of the pressure sprayers commonly used for this purpose. Other devices commonly used in the art can be used to apply the composition described herein. Various amounts of fine sand may be added to the composition to form a thick slurry of the sand for use in filling potholes, large cracks, and the like.

The following examples illustrate the preparation of the compositions of the present invention and their application to pavements. Although certain specified ingredients are used in these examples, the invention is not limited thereto, and other ingredients within the scope of the above description can be substituted therefor.

EXAMPLE 1

Preparation of resin and oil mixture

Aromatic oil (18 parts) consisting essentially of a mixture of highly viscous aromatic compounds and having a viscosity of 262 S.S.U. at 210° F. and an aniline point of 46° C., and naphthenic oil (18 parts) consisting essentially of a mixture of viscous cycloparaffinic compounds and having a viscosity of 89 S.S.U. at 210° F. and an aniline point of 75° C., are blended and slowly heated to 220°–240° F. Crumb styrene-butadiene rubber (4 parts) having a Mooney viscosity ML 4 min. at 212° F. of 0.046–0.054 inch, which can be purchased as Ameripol 1006, is added to the oils and stirred until the rubber dissolved therein. The blending apparatus is flushed with carbon dioxide gas and stirring is continued for about 16 hours under a blanket of the gas. To this solution is added crushed substantially completely polymerized synthetic aromatic thermoplastic hydrocarbon resin, softening point 238° F. (60 parts) having a mixed aniline point of 31.6° C., an iodine number of 125, an acid number of 0, and a molecular weight range of 800–1200 as determined by cryoscopic means. Stirring is continued for an additional hour, at which time the resin is dissolved into solution. The resulting mixture is a resin and oil mixture suitable for use in preparing the compositions of the present invention. The resin employed in this and similar examples can be prepared as described in U.S. Patent No. 2,798,866.

EXAMPLE 2

Preparation of an emulsion of resin and oil mixture

Product of Example 1 (2000 grams) was stirred with a laboratory mechanical stirrer set at its slowest rate of speed. The product was slowly heated to, and thereafter maintained at 190°–200° F. A nonionic surfactant, nonyl phenoxy polyoxyethylene ethanol (149 grams), and the sodium salt of an alkyl aryl polyether sulfonate (50 grams) were added into the heated mixture until a uniform mixture was obtained. Water (1381 grams) was slowly added at the temperature of the mixture with stirring. A water-in-resin and oil mixture emulsion was first formed which inverted to a resin and oil mixture-in-water emulsion as indicated by the change from a doughy to milky consistency. After all the water had been added, the emulsion thus formed had a viscosity of 53 Kreb units, a solids content of 60.8% by weight, a density of 8.4 pounds per gallon and a pH of 7.3. This emulsion also had the following properties as determined by ASTM Method D244–60 and AASHO Method T–59:

| | |
|---|---|
| Furol viscosity at 77° F. _____sec__ | 40.0 |
| Settlement, 5 days _____percent__ | .75 |
| Residue by evaporation _____do____ | 63.9 |
| Demulsibility: | |
|     35 ml. of 0.02 N CaCl$_2$ _____ | None |
|     50 ml. of 0.10 N CaCl$_2$ _____ | None |
| Sieve test (retained on No. 20 sieve) ___percent__ | 0.0 |
| Cement mixing test _____do____ | 4.5 |
| Tests on residue of emulsion: | |
|     Penetration 77° F., 100 g., 5 seconds _____ | 35 |
|     Ductility at 77° F., 5 cm./min. _____cm__ | +150 |
|     Solubility in CCl$_4$ _____percent__ | 99.58 |

EXAMPLE 3

Preparation of composition and its application to pavement

Water (195 grams) and tetrapotassium pyrophosphate (2.7 grams) were placed in a laboratory mixer and mixed for several minutes until thoroughly blended. Titanium dioxide (70 grams), followed by large particle size calcium carbonate (143 grams), asbestos fibers (20 grams) and mica (125 grams) were added to the mixture and the latter stirred. "Colloid 677" marketed by Colloids, Inc., Newark, N.J., a pale yellow, liquid defoamer having a pH (1% dispersion) of 5.7–6.2 and a specific gravity at 60° F. of 0.881 (6 grams) and ethylene glycol (10 grams) were added, followed by phenyl mercuric acetate (2 grams). A 2% aqueous solution of hydroxyl ethyl cellulose (150 grams) was then added, the mixture stirred, and mineral spirits (3.0 grams) added. Emulsion prepared in Example 2 (360 grams) was slowly added to the mixture and mixed until a homogeneous dispersion was formed. The composition thus formed had a viscosity of 69 Krebs units, which increased to 75 Krebs units after standing for 48 hours. A paint brush was dipped into the composition and then drawn across a one foot by one foot asphalt block until a thin coating of the composition was deposited on the surface. It was determined that the surface was effectively sealed against water.

EXAMPLE 4

Preparation of resin and oil mixture

Aromatic oil (48 parts by weight) consisting essentially of a mixture of highly viscous aromatic compounds and having a viscosity of 267.8 S.S.U. at 210° F. and an aniline point of 42° C., is slowly heated to about 200° F. Crumb styrene-butadiene rubber (4 parts by weight), described in Example 1, is added and the resulting mixture stirred at that temperature for several hours until the rubber dissolves in the oil. The blending apparatus is flushed with inert gas and maintained under a blanket of inert gas as described in Example 1. Crushed substantially completely polymerized synthetic aromatic thermoplastic hydrocarbon resin, softening point 242° F. (48 parts by weight) having a mixed aniline point of 31.8° C., an iodine number of 125, an acid number of 0, and a molecular weight range of 800–1200 as determined by cryoscopic means is added to the rubber and oil solution. The temperature is raised to about 240° F. and the mixture stirred for an additional hour until the resin is dissolved into solution.

EXAMPLE 5

Preparation of an emulsion of resin and oil mixture

Product of Exampule 4 (2000 grams) was stirred with a laboratory mechanical stirrer set at its slowest rate of speed. The product was slowly heated to and thereafter maintained at about 170° F. Fatty acid tall oil (180 grams), 2-amino-2-methylpropanol (56.4 grams) and a nonionic surfactant, nonyl phenoxy polyoxyethylene ethanol (20 grams), were added into the heated mixture until a uniform mixture was obtained. Water (2200 grams) was slowly added to the temperature of the mixture with stirring. A water-in-resin and oil mixture emulsion was first formed which inverted to a resin and oil mixture-in-water emulsion as indicated by a change from a doughy to a milky consistency. After all the water had been added, the emulsion thus formed had a viscosity of 53 Krebs units, a solid content of 50.6% by weight, a density of 8.4 pounds per gallon and a pH of 8.8.

EXAMPLE 6

Preparation of composition and its application to pavement

Water (54 grams) and tetrapotassium pyrophosphate (2 grams) were placed in a laboratory mixer and mixed for several minutes until thoroughly blended. A water solution of toluidine red (160 grams) followed by large particle size calcium carbonate (108 grams) and medium size talc (148 grams) were added to the mixture. "Colloid 677," marketed by Colloids, Inc., Newark, N.J., a pale yellow, liquid defoamer having a pH (1% dispersion) of 5.7–6.2 and a specific gravity at 60° F. of 0.881 (3 grams), a solution of dietertiary acetylenic glycol in ethylene glycol (3 grams) and ethylene glycol (10 grams) were added followed by phenyl mercuric acetate (2 grams). A 2% aqueous solution of hydroxy ethyl cellulose (100 grams) was then added and the mixture stirred. Emulsion prepared in Example 5 (424 grams) was slowly added with stirring to the mixture. The resulting mixture was stirred until a homogeneous dispersion was formed. The composition thus formed had a viscosity of 70 Krebs units, which increased to 72 Krebs units after 48 hours.

The surface of an oxidized, spalled asphalt driveway was swept of dirt and wetted down with a fine mist of water. Oil spots were washed with detergent solutions. The composition prepared above was poured onto a portion of the driveway and evenly spread with a push broom type brush. Upon drying, the coated surface was bright red and was effectively sealed against moisture.

EXAMPLE 7

Preparation of colored compositions

A series of colored compositions of the present invention were prepared according to the procedure of Example 6 utilizing the ingredients in the stated proportions by weight listed below:

|  | Blue | Gray | Yellow | Green |
|---|---|---|---|---|
| Water | 145 | 145 | 191 | 145 |
| TKPP [1] | 2 | 2.7 | 2 | 2 |
| Titanium dioxide | 100 | 150 | | |
| Copper phthalocyanine [2] | 20 | | | |
| Lampblack | | 0.5 | | |
| Lead chromate yellow | | | 103.5 | |
| Iron oxide yellow | | | 34 | |
| Chrome oxide green | | | | 120 |
| Calcium carbonate, large | 110 | 130 | 130 | 127 |
| Talc, medium | 150 | 150 | 148 | 148 |
| Wetting agent [3] | 2 | 2 | 4 | 2 |
| Defoamer [4] | 6 | 6 | 6 | 6 |
| Ethylene glycol | 10 | 10 | 10 | 10 |
| Phenyl mercuric acetate | 2 | 2 | 2 | 2 |
| 2% hydroxy ethyl cellulose [5] | 150 | 150 | 100 | 150 |
| Emulsion of Example 5 | 400 | 400 | 400 | 400 |
| Viscosity, Krebs units | 70 | 70 | 70 | 72 |

[1] Tetrapotassium pyrophosphate.
[2] Hydrogen atoms replaced with chlorine atoms.
[3] Polyoxyethylated t-octylphenol type setting agent.
[4] "Colloid 677" described in Examples 3 and 6.
[5] Aqueous solution.

The sealing and coloring compositions of the present invention prepared in Example 7 had excellent properties and were suitable for use in sealing and coloring pavements, such as the driveway described in Example 6.

The present invention provides coating compositions which, when applied to pavement, seals the pores of the pavement against the seepage of moisture, and provides a colored, light reflecting surface having improved physical properties. The composition can also be used to revitalize colored pavements, to restore the color and improve its surface qualities. However, the composition of the present invention is most advantageously used upon asphalt pavements, whether new or old, to seal the pavements against the seepage of moisture, prevent oxidation of the asphalt binder, and to provide a colored, light-reflecting durable surface to the pavement having improved surface properties over the original asphalt surface.

We claim:

1. A coating composition for sealing and coloring pavements consisting essentially of
    (1) from about 10 to about 40 weight percent pigment;
    (2) from about 15 to about 40 weight percent water;
    (3) from about 30 to about 80 weight percent of an aqueous emulsion comprising a mixture of substantially completely polymerized thermoplastic petroleum-derived hydrocarbon resin having a softening point range of from about 220° F. to about 300° F., a mixed aniline point of from about 20° C. to about 60° C., an iodine number of from about 40 to about 160, an acid number of from 0 to about 4, and a molecular weight of from about 600 to about 1700 as determined by cryoscopic means and viscous oil selected from the group consisting of aromatic oil, naphthenic oil consisting essentially of a mixture of viscous alicyclic hydrocarbons, and mixtures thereof; and
    (4) from 0 to about 50 weight percent of an extender for the pigment.

2. A coating material for sealing and coloring pavements consisting essentially of:
    (1) from about 10 to about 40 weight percent light stable pigment;
    (2) from about 15 to about 40 weight percent water;
    (3) from about 30 to about 80 weight percent of an emulsion comprising:
        (a) a mixture comprising from about 30 to about 70 parts by weight substantially completely polymerized thermoplastic petroleum-derived hydrocarbon resin having a softening point range of from about 220° to about 300° F., a mixed aniline point of from about 20° to about 60° C., an iodine number of from about 40 to about 160, an acid number of from 0 to about 4, and a molecular weight of from about 600 to about 1700 as determined by cryoscopic means; and from about 30 to about 70 parts by weight viscous oil selected from the group consisting of aromatic oil, naphthenic oil consisting essentially of a mixture of viscous alicyclic hydrocarbons, and mixtures thereof;

(b) an emulsifying quantity of emulsifier for the resin and viscous oil mixture, said emulsifier selected from the group consisting of cationic, anionic and nonionic emulsifiers and anionic-nonionic emulsifier pairs; and (c) from about 15 to about 75 weight percent water based on the weight of resin and viscous oil mixture and emulsifier; and (4) from 0 to about 50 weight percent of an extender for the pigment.

3. A coating composition for sealing and coloring pavements consisting essentially of:

(1) from about 10 to about 40 weight percent of a light stable pigment;

(2) from about 15 to about 40 weight percent water;

(3) from about 30 to about 80 weight percent of an aqueous emulsion comprising:

(a) a mixture comprising from about 1 to about 10 parts by weight hydrocarbon rubber selected from the group consisting of butadiene-styrene co-polymer, polyisoprene, polybutadiene and polyisobutylene; from about 30 to about 70 parts by weight substantially completely polymerized, aromatic, thermoplastic, petroleum-derived hydrocarbon resin, having a softening point range of from about 220° to about 300° F., a mixed aniline point of from about 20° to about 60° C., an iodine number of from about 40 to about 160, an acid number of from 0 to about 4, and a molecular weight of from about 600 to about 1700 as determined by cryoscopic means; and from about 30 to about 70 parts by weight viscous oil selected from the group consisting of aromatic oil, naphthenic oil consisting essentially of a mixture of viscous alicyclic hydrocarbons, and mixtures thereof;

(b) an emulsifying quantity of emulsifier for the rubber, resin and viscous oil mixture, said emulsifier selected from the group consisting of cationic, anionic, and nonionic emulsifiers and anionic-nonionic emulsifier pairs; and (c) from about 15 to about 75 percent by weight water based on the weight of resin and viscous oil mixture and emulsifier; and (4) from 0 to about 50 weight percent of an extender for the pigment.

4. A coating composition for sealing and coloring pavements consisting essentially of:

(1) from about 10 to about 40 parts by weight light stable pigment;

(2) from about 15 to about 40 parts by weight water; and (3) from about 30 to about 80 parts by weight aqueous emulsion comprising:

(a) from about 45 to about 70 parts by weight of a mixture comprising from about 30 to about 70 percent by weight substantially completely polymerized aromatic, thermoplastic, petroleum-derived hydrocarbon resin, having a softening point range of from about 220° to about 300° F., a mixed aniline point of from about 20° to about 60° C., an iodine number of from about 40 to about 160, an acid number of from 0 to about 4, and a molecular weight of from about 600 to about 1700 as determined by cryoscopic means; and from about 30 to about 70 percent by weight oil selected from the group consisting of aromatic oil having a viscosity of from about 120 to about 300 S.S.U. at 210° F. and an aniline point of from about 20 to about 60° C. naphthenic oil consisting essentially of a mixture of viscous alicyclic hydrocarbons having a viscosity of from about 40 to about 200 S.S.U. at 210° F. and an aniline point of from about 50 to about 150° C., and mixtures thereof;

(b) from about 2 to about 10 parts by weight emulsifier for the resin and oil mixture, said emulsifier selected from the group consisting of cationic, anionic and nonionic emulsifiers and anionic-nonionic emulsifier pairs; and (c) from about 20 to about 50 parts by weight water; and (4) from 0 to about 50 parts by weight of an extender for the pigment selected from the group consisting of calcium carbonate, talc, mica, pumice, diatomaceous silicas, synthetic calcium silicates, hydrated sodium silico aluminate, coprecipitate of titanium dioxide and barium sulfate, coprecipitate of titanium dioxide and calcium sulfate, mixtures of silicon dioxide and calcium oxide, and mixtures thereof.

5. A coating composition for sealing and coloring pavements consisting essentially of:

(1) from about 10 to about 40 parts by weight light stable pigment;

(2) from about 15 to about 40 parts by weight water; and (3) from about 30 to about 80 parts by weight aqueous emulsion comprising:

(a) from about 45 to about 70 parts by weight of a mixture comprising from about 1 to about 10 percent by weight hydrocarbon rubber selected from the group consisting of butadiene-styrene co-polymer, polyisoprene, polybutadiene and polyisobutylene; from about 30 to about 70 percent by weight substantially completely polymerized aromatic, thermo-plastic petroleum-derived hydrocarbon resin, having a softening point range of from about 220° to about 300° F., a mixed aniline point of from about 20° to about 60° C., an iodine number of from about 40 to about 160, an acid number of from 0 to about 4, and a molecular weight of from about 600 to about 1700 as determined by cryoscopic means; and from about 30 to about 70 percent by weight oil selected from the group consisting of aromatic oil having a viscosity of from about 120 to about 300 S.S.U. at 210° F. and an aniline point of from about 20° to about 60° C., naphthenic oil consisting essentially of a mixture of viscous alicylic hydrocarbons having a viscosity of from about 40 to about 200 S.S.U. at 210° F. and an aniline point of from about 50 to about 150° C., and mixtures thereof;

(b) from about 2 to about 10 parts by weight emulsifier for the rubber, resin and oil mixture, said emulsifier selected from the group consisting of cationic, anionic, and nonionic emulsifiers and anionic-nonionic emulsifier pairs; and (c) from about 20 to about 50 parts by weight water; and (4) from 0 to about 50 parts by weight of an extender for the pigment selected from the group consisting of calcium carbonate, talc, mica, pumice, diatomaceous silicas, synthetic calcium silicates, hydrated sodium silico aluminate, coprecipitate of titanium dioxide and barium sulfate, coprecipitate of titanium dioxide and calcium sulfate, mixture of silicon dioxide and calcium oxide, and mixtures thereof.

6. A method of sealing and coloring pavement which comprises applying to the surface of said pavement a coating composition consisting essentially of:
   (1) from about 10 to about 40 weight percent pigment;
   (2) from about 15 to about 40 weight percent water;
   (3) from about 30 to about 80 weight percent of an aqueous emulsion comprising a mixture of substantially completely polymerized thermoplastic petroleum-derived hydrocarbon resin having a softening point range of from about 220° F. to about 300° F., a mixed aniline point of from about 20° C. to about 60° C., an iodine number of from about 40 to about 160, an acid number of from 0 to about 4, and a molecular weight of from about 600 to about 1700 as determined by cryoscopic means and viscous oil selected from the group consisting of aromatic oil, naphthenic oil consisting essentially of a mixture of viscous alicyclic hydrocarbons, and mixtures thereof; and
   (4) from 0 to about 50 weight percent of an extender for the pigment.

7. A method for sealing and coloring pavement which comprises applying to the surface of said pavement a thin continuous film of a coating composition consisting essentially of:
   (1) from about 10 to about 40 weight percent light stable pigment;
   (2) from about 15 to about 40 weight percent water;
   (3) from about 30 to about 80 weight percent of an emulsion comprising
      (a) a mixture comprising from about 30 to about 70 parts by weight substantially completely polymerized thermoplastic petroleum-derived hydrocarbon resin having a softening point range of from about 220° to about 300° F., a mixed aniline point of from about 20° to about 60° C., an iodine number of from about 40 to about 160, an acid number of from 0 to about 4, and a molecular weight of from about 600 to about 1700 as determined by cryoscopic means; and from about 30 to about 70 parts by weight viscous oil selected from the group consisting of aromatic oil, naphthenic oil consisting essentially of a mixture of viscous alicyclic hydrocarbons, and mixtures thereof;
      (b) an emulsifying quantity of emulsifier for the resin and viscous oil mixture, said emulsifier selected from the group consisting of cationic, anionic and nonionic emulsifiers and anionic-nonionic emulsifier pairs; and
      (c) from about 15 to about 75 percent by weight water based on the weight of resin and viscous oil mixture and emulsifier; and
   (4) from 0 to about 50 weight percent of an extender for the pigment.

8. A method for sealing and coloring pavement which comprises applying to the surface of said pavement a thin continuous film of a coating composition consisting essentially of:
   (1) from about 10 to about 40 parts by weight light stable pigment;
   (2) from about 15 to about 40 parts by weight water; and
   (3) from about 30 to about 80 parts by weight aqueous emulsion comprising:
      (a) from about 45 to about 70 parts by weight of a mixture comprising from about 1 to about 10 percent by weight hydrocarbon rubber selected from the group consisting of butadiene-styrene co-polymer, polyisoprene, polybutadiene and polyisobutylene; from about 30 to about 70 percent by weight substantially completely polymerized aromatic, thermoplastic, petroleum-derived hydrocarbon resin, having a softening point range of from about 220° to about 300° F., a mixed aniline point of from about 20 to about 60° C., an iodine number of from about 40 to about 160, an acid number of from 0 to about 4, and a molecular weight of from about 600 to about 1700 as determined by cryoscopic means; and from about 30 to about 70 percent by weight oil selected from the group consisting of aromatic oil having a viscosity of from about 120 to about 300 S.S.U. at 210° F. and an aniline point of from about 20° to about 60° C., naphthenic oil consisting essentially of a mixture of viscous alicyclic hydrocarbons having a viscosity of from about 40 to about 200 S.S.U. at 210° F. and an aniline point of from about 50° to about 150° C., and mixtures thereof;
      (b) from about 2 to about 10 parts by weight emulsifier for the rubber, resin and oil mixture, said emulsifier selected from the group consisting of cationic, anionic, and nonionic emulsifiers and anionic-nonionic emulsifier pairs; and
      (c) from about 20 to about 50 parts by weight water; and
   (4) from 0 to about 50 parts by weight of an extender for the pigment selected from the group consisting of calcium carbonate, talc, mica, pumice, diatomaceous silicas, synthetic calcium silicates, hydrated sodium silico aluminate, coprecipitate of titanium dioxide and barium sulfate, coprecipitate of titanium dioxide and calcium sulfate, mixtures of silicon dioxide and calcium oxide and mixtures thereof.

9. A colored and sealed pavement which comprises a pavement and a thin continuous veneer bound to the surface thereof, said veneer comprising the residue upon evaporation of a coating composition for sealing and coloring pavements consisting essentially of
   (1) from about 10 to about 40 weight percent pigment;
   (2) from about 15 to about 40 weight percent water;
   (3) from about 30 to about 80 weight percent of an aqueous emulsion comprising a mixture of substantially completely polymerized thermoplastic petroleum-derived hydrocarbon resin having a softening point range of from about 220° F. to about 300° F., a mixed aniline point of from about 20° C. to about 60° C., an iodine number of from about 40 to about 160, an acid number of from 0 to about 4, and a molecular weight of from about 600 to about 1700 as determined by cryoscopic means and viscous oil selected from the group consisting of aromatic oil, naphthenic oil consisting essentially of a mixture of viscous alicyclic hydrocarbons, and mixtures thereof; and
   (4) from 0 to about 50 weight percent of an extender for the pigment.

References Cited

UNITED STATES PATENTS

| | | | |
|---|---|---|---|
| 2,798,867 | 7/1957 | Gordon et al. | 260—82 |
| 2,809,948 | 10/1957 | Hunter et al. | 260—296 |
| 2,709,695 | 5/1965 | Wadsworth | 260—27 |
| 2,823,194 | 2/1958 | McKay et al. | 260—88.7 |
| 3,037,881 | 6/1962 | McDowell | 260—88.9 |
| 3,070,570 | 12/1962 | Gessler et al. | 260—89.2 |
| 3,093,601 | 6/1963 | Gessler et al. | 260—88.7 |
| 3,297,617 | 1/1967 | Rebenstein et al. | 260—29.6 |

MURRAY TILLMAN, *Primary Examiner.*

M. J. TULLY, *Assistant Examiner.*